United States Patent [19]

Whitehead

[11] E Patent Number: Re. 33,165

[45] Reissued Date of Patent: Feb. 13, 1990

[54] BOAT HULL WITH FLOW CHAMBER

[76] Inventor: Robert M. Whitehead, Box 337, Big Pine Key, Fla. 33043

[21] Appl. No.: 238,558

[22] Filed: Aug. 30, 1988

Related U.S. Patent Documents

Reissue of:

[64] Patent No.: 4,609,360
Issued: Sep. 2, 1986
Appl. No.: 630,300
Filed: Jul. 12, 1984

[51] Int. Cl.[4] ..... B63H 5/16
[52] U.S. Cl. ..... 440/69; 114/288
[58] Field of Search ..... 440/68–70, 440/71, 79, 39, 62; 114/148, 288

[56] References Cited

U.S. PATENT DOCUMENTS

| | | | |
|---|---|---|---|
| 815,187 | 3/1906 | Manker | 114/288 |
| 2,985,133 | 5/1961 | Shaffer | 440/71 |
| 3,937,173 | 2/1976 | Stuart | 440/69 |
| 4,300,889 | 11/1981 | Wormser | 440/69 |

FOREIGN PATENT DOCUMENTS

| | | | |
|---|---|---|---|
| 211927 | 2/1924 | United Kingdom | 440/79 |

*Primary Examiner*—Joseph F. Peters, Jr.
*Assistant Examiner*—Jesus D. Sotelo
*Attorney, Agent, or Firm*—James H. Beusse

[57] ABSTRACT

A boat hull having a two-stage flow chamber. The first stage flow chamber starts about amidships as a V-shape fairing upward at a shallow angle and flattening out about halfway to the stern. The second stage flow chamber starts at the end of the forward flow chamber curving upward at a greater angle than the first stage and curving downward slightly at the stern. The second state flow chamber has an inverted V-shape portion connected to the bottom by a pair of narrow sidewalls spreading slightly outward. The forward flwo chamber delivers water to the aft flow chamber free from turbulence. The propeller is disposed in the aft flow chamber and splayed slighly to port. Water exits from the aft flow chamber with minimum turbulence and cavitation.

10 Claims, 2 Drawing Sheets

BOAT HULL WITH FLOW CHAMBER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to boat hulls, and more particularly to a boat hull having a two-stage flow chamber in which the driving propeller is disposed.

2. Description of the Prior Art

It is well known in the prior art to provide a tunnel or propeller pocket in the hull of a boat to provide additional clearance between the bottom of the hull and the bottom of the waterway. In addition, it has been suggested that such tunnels tend to improve the efficiency of the propulsion system. Early patents, such as U.S. Pat. No. 128,407, have disclosed tunnels running the entire length of the hull which effectively forms a double hull. The use of pockets or cavities at the stern of the boat in which the propeller is mounted had been taught by the following U.S. Pat. Nos. 111,462; 3,515,087; 3,611,973; 4,371,350; and 4,383,828.

Generally, these patents teach a cavity or pocket which may extend for about one-third the length of the hull at the stern. A typical design is taught by the '087 and '973 patents both issued to Stuart. Stuart shows a U-shaped tunnel running aft to the amidship line of the hull toward the stern. The tunnel smoothly increases in size and diameter as it runs aft and is opened fully at the stern. Stuart claims an advantage in that the slipstream of water in the tunnel and aft of the propeller results in a jet-like stream of water producing a reaction drive similar to a jet engine.

I have found, however, that the Stuart design having a U-shaped cavity has a serious problem in that the water received by the propeller has been foiled off of the hull causing turbulence and cavitation. The result is poor performance of the propeller. Thus, there is a need for a hull tunnel design to provide the advantages of the low draft, yet which will not sacrifice efficiency due to turbulence and cavitation in the tunnel. I refer to such a design as a "flow chamber" since water will flow with a minimum of turbulence.

SUMMARY OF THE INVENTION

My improved flow chamber for a boat hull overcomes the problems in the prior art and provides efficient propulsion with a low draft. A two stage flow chamber is provided starting approximately at the midpoint of the keel. The flow chamber starts at a point for which the hull is still in the water when the boat is planing. The first section of the flow chamber has an initial V-shape with the same angle as the hull and increases in cross-sectional area, at a shallow angle flattening out toward the stern of the boat. The second section of the flow chamber begins at the aft end of the first section, curving upward at a larger angle and curving downward slightly at the stern. A [keelson] *keel* is provided in the first section of the flow chamber which terminates at the beginning of the aft section of the flow chamber. I have determined that the aft flow chamber portion is most efficient when an inverted V-design is used rather than the conventional U-design of the prior art. The propeller is disposed in the tunnel with standard design clearance to the hull from the tip of the outside propeller. The propeller shaft line is splayed to port approximately five inches from the center line of the keel utilizing a righthand propeller. Splaying increases the propeller torque and efficiency and also permits backing of the boat in a straight line.

With the above-described flow chamber design, water enters the forward section of the flow chamber and is delivered to the aft section on a flat plane to prevent turbulence and cavitation. The water exits from the tunnel in a smooth laminar flow thereby reducing drag and loss of propulsion.

A rudder may be mounted along the keel line aft of the propeller in a conventional fashion. If desired, a flat metal skeg may be disposed running from the aft end of the [keelson] *keel* to the bottom of the rudder post for protection of the propeller, propeller strut and rudder.

Therefore, it is a principal object of my invention to provide a flow chamber design for a hull which is relatively free from turbulence and cavitation.

Another object of my invention is to provide a flow chamber hull for a boat having a shallow forward section and a deeper aft section with the forward section serving to deliver water in a flat plane to the aft section.

It is yet another object of my invention to provide a flow chamber hull for a boat in which the water flows smoothly through the tunnel with minimum turbulence and cavitation of the propeller.

It is still another object of my invention to provide a boat hull having a flow chamber for essentially enclosing the propeller which is splayed in the tunnel.

It is a further object of my invention to provide a two-stage flow chamber beginning approximately amidship in which the aft section of the tunnel is of a V-design.

These and other objects and advantages of my invention will become apparent from the following detailed description when read in conjunction with the drawings.

A BRIEF DESCRIPTION OF THE DRAWINGS

DETAILED DESCRIPTION OF THE PREFERRED EMBODIMENT

Figure 1:
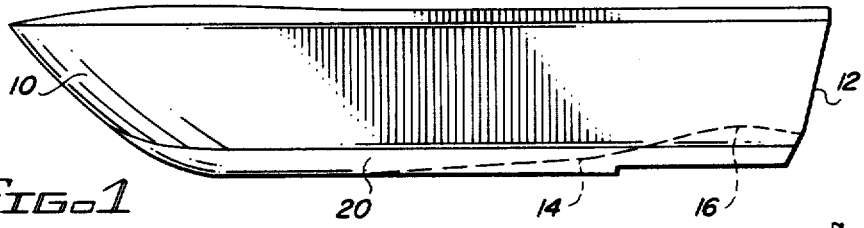
FIG. 1 is a side view of a boat hull in which my two-stage flow chamber is shown by dashed lines.

Referring first to FIG. 1, a side view of a hull 10 in accordance with the invention is shown. Hull 10 has a conventional V-bottom 20 and a stern transom 12. As shown by the dashed lines, a two-stage flow chamber 14, 16, is provided starting approximately amidship and extending to the transom 12.

Figure 2:
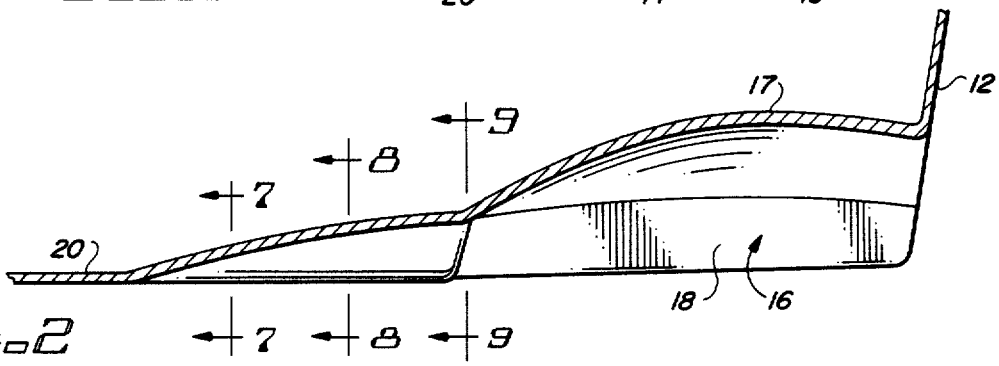
FIG. 2 is a partial cross-sectional view of the hull of FIG. 1 showing details of the flow chamber design.
Figure 3:
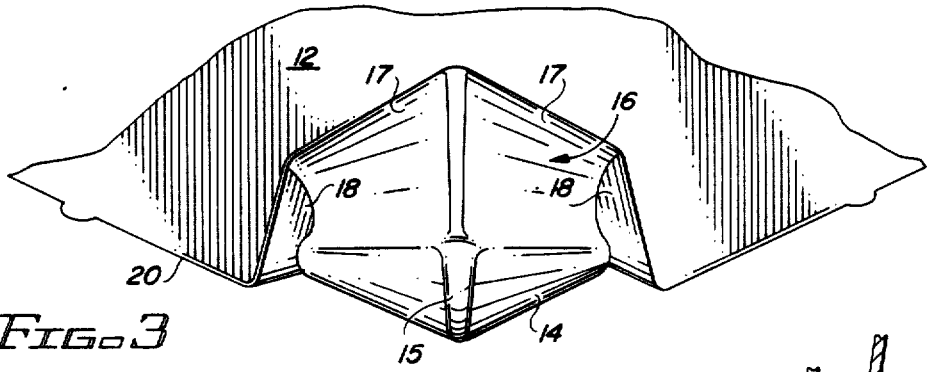
FIG. 3 is a partial view of the transom of the boat of FIG. 1 showing in more detail the shape of the flow chamber.

Details of the flow chamber are more clearly seen in FIGS. 2 and 3. In FIG. 2, a cross-section approximately along the keel line of hull 10 is shown. The forward or first stage flow chamber 14 may be observed to curve upward at a relatively shallow angle. A [keelson] *keel* 15 runs approximately the length of forward flow chamber 14. At the termination of forward flow chamber 14, the aft flow chamber 16 begins which curves upward at a sharper angle than the forward flow chamber 14 and curves downward slightly at the point of connection with transom 12 as indicated by the section of surface 17. The aft flow chamber 16 comprises two upper surfaces 17 forming a shallow inverted V and two side surfaces 18, joining surfaces 17 at an obtuse angle as indicated in FIG. 3 and connecting with the hull bottom 20. The shape of [keelson] *keel* 15 is also apparent from the view in FIG. 3.

Figure 7:
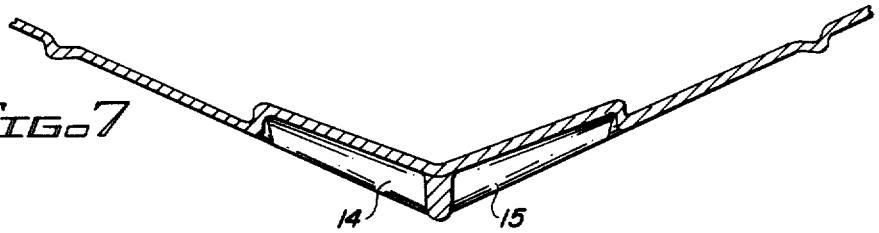
FIG. 7 is a cross-sectional view of the first stage tunnel along the plane 7—7 of FIG. 2.
Figure 8:
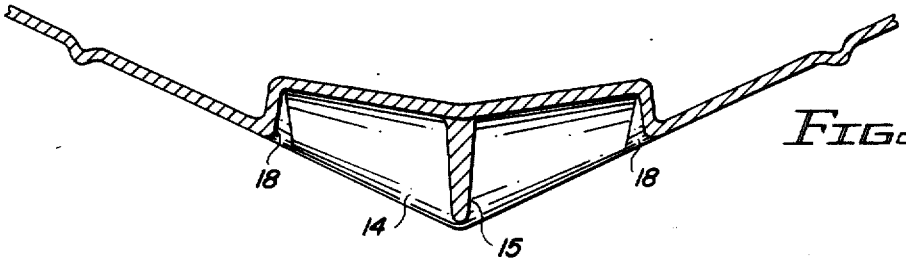
FIG. 8 is a cross-sectional view of the first stage tunnel along the plane 8—8 of FIG. 2.
Figure 9:
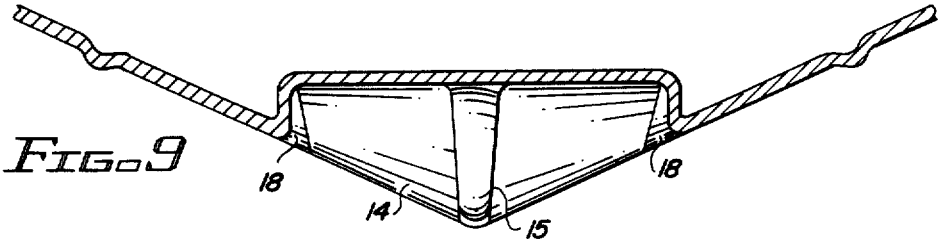
FIG. 9 is a cross-sectional view of the first stage tunnel along the plane 9—9 of FIG. 2.
Figure 10:
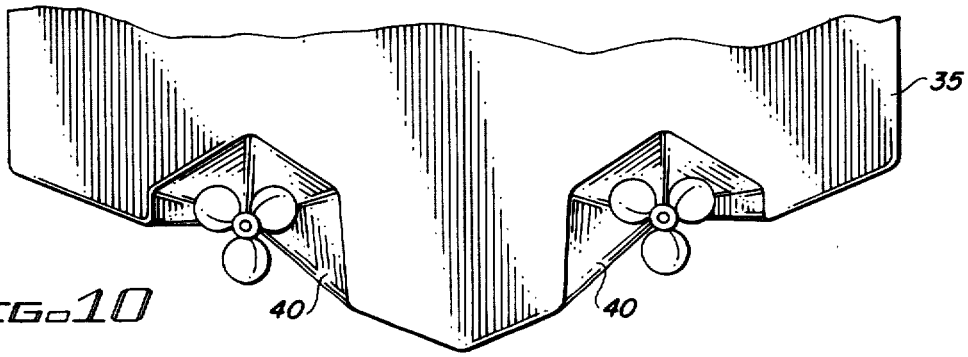
FIG. 10 is a stern view of the hull of an alternative embodiment of the invention having twin flow chambers.

The cross-sectional shape of forward flow chamber 14 is important to ensure a laminar flow of water into aft flow chamber 16. Referring to FIGS. 7–9, this shape is illustrated. Flow chamber 14 starts as a V parallel with the hull bottom (see FIG. 7) and gradually decreases in angle toward the aft flow chamber 16. As noted from FIG. 8, the angle of the V along plane 8—8 of FIG. 2 is approaching 180°. At the end of forward flow chamber and at the beginning of aft flow chamber 16, the angle is 180°, as seen in FIG. 9.

Advantageously, water is delivered to aft flow chamber 12 smoothly, without turbulence or cavitation.

Figure 4:
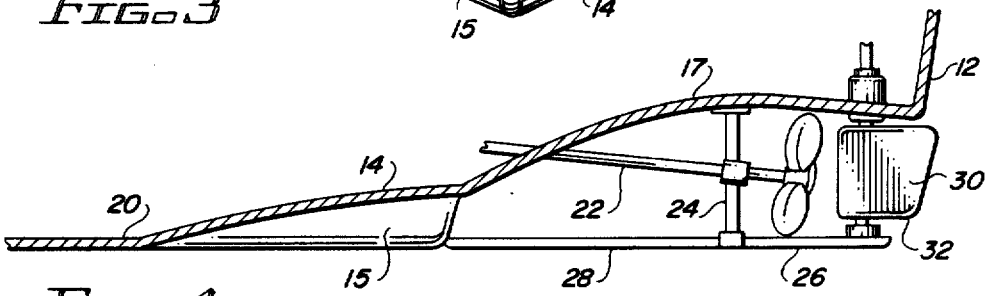
FIG. 4 is a partial cross-sectional view of the hull of FIG. 1 showing a propeller, rudder, and skeg installation.
Figure 5:
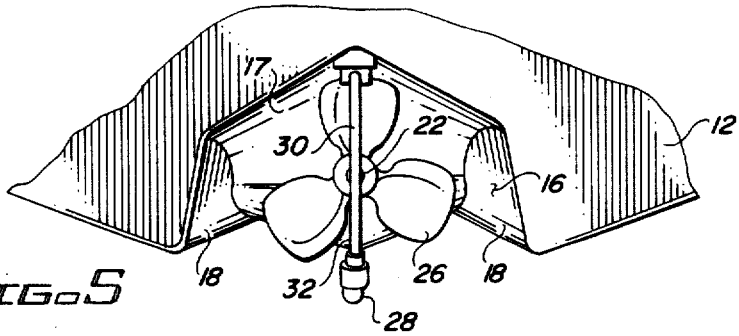
FIG. 5 is a stern view of the hull of FIG. 4 showing the transom, rudder, and propeller orientation.
Figure 6:
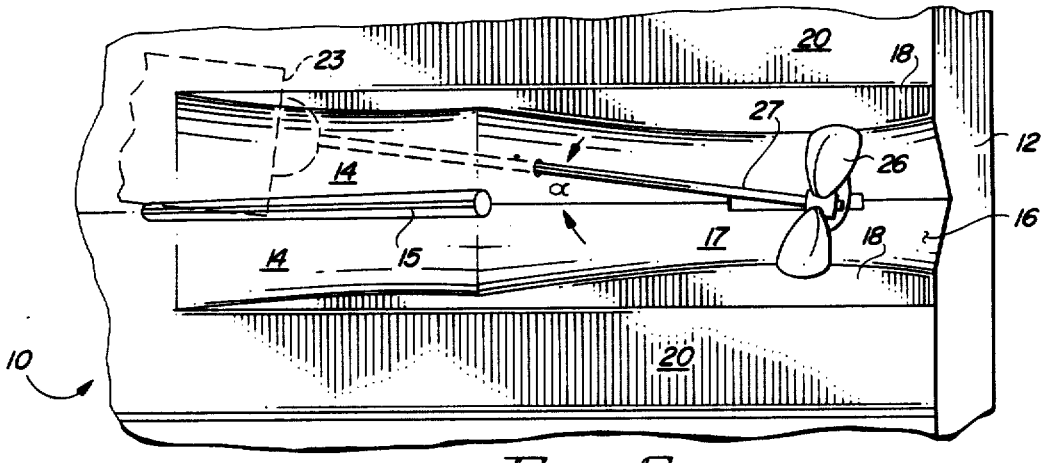
FIG. 6 is a bottom view of the hull of FIG. 1 showing the installation of the engine, propeller shaft, and propeller to illustrate the splaying of the shaft.

Turning now to FIGS. 4 and 5, the installation of the rudder and propeller is shown. As will be noted from FIG. 4, propeller shaft 22 enters the hull near the forward end of aft flow chamber 17 and is connected to a power plant not shown. A rudder 30 is illustrated mounted just aft of propeller 26. A flat metal skeg may be connected from the aft end of [keelson] *keel* 15 to propeller strut 24 and rudder post 32. The skeg 28 serves to protect these elements and to provide additional rigidity. As best seen in the bottom view of hull 10 of FIG. 6, power plant 23 and propeller shaft 22 are splayed to port by an angle.

Having shown the construction of my improved hull and flow chamber of the invention, the operation thereof will not be described. When the boat is underway, the V-shaped bottom 20 tends to cause the boat to plane. The hull design 10 is such that the forward point where forward flow chamber 16 is faired into the keel area 20 remains in the water. The flow of water over the surfaces of forward flow chamber 14 is relatively flat and is thus delivered to aft flow chamber 17 without turbulence. The forward motion of the boat and the action of propeller 26 will be to guide the water into the flow chamber 16 as a clean, laminar flow and, therefore, the propeller finds a solid stream of water against which to work. Cavitation is thus prevented and very little, if any, slippage will normally occur. Therefore, the maximum effectiveness of the propeller 26 is achieved. The slight downward curve of surface 17 (see FIG. 2) at the stern prevents the usual "rooster tail" that forms from a tunnel hull at high speeds, reducing the drag which would otherwise result.

An alternative embodiment of may invention is shown in the stern view of a hull 35 in FIG. 7. As may be noted, the alternative design is for use with twin propeller drives. A pair of flow chambers 40 is disposed with one on either side of the keel. Flow chambers 40 are otherwise identical to flow chambers 14 and 16 previously described.

It is to be understood that the illustrations shown above are for exemplary purposes only and various changes may be made to my design by those of skill and art without departing from the spirit and scope of my invention.

I claim:

1. A boat hull having a V bottom and a keel line comprising:

a forward flow chamber defined by a first surface beginning approximately amidships of said hull and extending above the keel line thereof starting as a V-shape lying essentially transverse to the keel line, said first surface connected to said bottom by a pair of planar sides fairing slightly outboard from a vertical plane, said forward flow chamber gradually increasing in cross-sectional area as extended aft and the angle of said V-shape increasing such that the angle of said surface at the aft end of said forward flow chamber is approximately 180°;

a [keelson] *keel* disposed and aligned longitudinally with said keel line in said forward flow chamber; and an aft flow chamber defined by a second surface beginning at said aft end of said forward flow chamber and curving upward as an inverted V-shape, said second surface connected to said bottom by aft extensions of said pair of planar sides, said second surface curving downward slightly at the stern of said hull;

whereby said forward flow chamber delivers water to said aft flow chamber smoothly with minimum turbulence and water issues from said aft flow chamber with minimum cavitation and turbulence.

2. The hull as defined in claim 1 in which the rate at which said second surface curves upward is greater than the rate of upward extension of said first surface.

3. The hull as defined in claim 2 in which said upward extension of said first surface forms a curve.

4. The hull as defined in claim 1 which further comprises a propeller shaft and a propeller disposed in said aft flow chamber, said propeller shaft splayed with respect to said keel line.

5. The hull as defined in claim 4 in which said aft flow chamber comprises a tunnel, said propeller being disposed completely within said tunnel.

6. The hull as defined in claim 1 which further comprises a skeg extending from the aft end of said [keelson] *keel* aft to said stern.

*7. A boat hull having at least one two-stage flow chamber comprising:*

*a V-bottom hull having a forward flow chamber stage defined by a first surface beginning with a flow entry portion parallel to adjacent surfaces of the boat hull and gradually increasing in depth as said forward stage extends toward an aft end of the boat hull, said first surface angularly varying from a plane parallel to said surface of the hull to a plane lying substantially parallel to a surface of water when the boat hull is at rest in the water; and*

*an aft flow chamber stage aligned with an aft end of said forward flow chamber stage and defined by a second surface beginning at said aft end of said forward flow chamber stage and curving upward into an inverted V-shape and having a pair of opposed planar sides connecting said second surface to said boat hull.*

*8. The boat hull of claim 7 and including a second flow chamber having corresponding forward and aft flow chamber stages substantially identical to said forward flow chamber stage and said aft flow chamber stage, respectively, of said at least one flow chamber, said second flow chamber being positioned parallel to said at least one flow chamber on an opposite side of a keel line of the boat hull, an additional propeller and drive shaft being disposed within only said aft flow chamber stage of said second flow chamber.*

*9. The boat hull chamber of claim 7 and including a second flow chamber substantially identical to said at least one flow chamber, said second flow chamber being positioned parallel to said at least one flow chamber.*

*10. The boat hull of claim 7 and including a keel disposed only within and aligned longitudinally with a longitudinal mid-line of said forward flow chamber stage.*

* * * * *